United States Patent [19]
Igarashi et al.

[11] Patent Number: 6,111,762
[45] Date of Patent: Aug. 29, 2000

[54] SWITCHING POWER SUPPLY

[75] Inventors: Seiki Igarashi; Akio Suzuki, both of Kawasaki, Japan

[73] Assignee: Fuji Electric Co., Ltd., Kawasaki, Japan

[21] Appl. No.: 09/234,260

[22] Filed: Jan. 20, 1999

[30] Foreign Application Priority Data

Feb. 27, 1998 [JP] Japan .................................. 10-046892

[51] Int. Cl.[7] .............................................. H02M 3/335
[52] U.S. Cl. .............................. 363/21; 363/97; 363/132
[58] Field of Search .............................. 363/16, 20, 21, 363/56, 95, 97, 131, 132

[56] References Cited

U.S. PATENT DOCUMENTS

| | | | |
|---|---|---|---|
| 4,649,464 | 3/1987 | Shono | 363/21 |
| 5,168,435 | 12/1992 | Kobayashi et al. | 363/20 |
| 5,414,611 | 5/1995 | Muto et al. | 363/21 |
| 5,581,451 | 12/1996 | Ochiai | 363/21 |
| 5,638,262 | 6/1997 | Brown | 363/21 |
| 5,661,642 | 8/1997 | Shimashita | 363/21 |
| 5,675,485 | 10/1997 | Seong | 363/97 |
| 5,699,239 | 12/1997 | Komori | 363/21 |
| 5,771,163 | 6/1998 | Moriguchi et al. | 363/71 |
| 5,793,621 | 8/1998 | Yamada | 363/21 |
| 5,825,638 | 10/1999 | Shutts | 363/21 |
| 5,917,711 | 6/1999 | Shikata et al. | 363/16 |

FOREIGN PATENT DOCUMENTS

| | | |
|---|---|---|
| 09117134 | of 0000 | Japan . |
| 06292358 | 10/1994 | Japan . |

*Primary Examiner*—Adolf Deneke Berhane
*Attorney, Agent, or Firm*—Baker & Botts, L.L.P.

[57] ABSTRACT

A switching power supply for outputting an isolated DC voltage includes a transformer TR1 having a secondary winding N21 and a tertiary winding N3; a semiconductor switch Q1; a DC voltage source (capacitor) C1 connected to the transformer TR1 and the semiconductor switch Q1; a rectifier D1 connected to the secondary winding N21; a power IC, the power supply voltage for which is obtained by rectifying the output of the tertiary winding N3 of the transformer TR1; and a comparator IC5 for detecting the voltage of the control power supply that is lower than a predetermined value, by which to shift to the power saving mode of operation. The above configuration eliminates the photo-coupler for transmitting the power saving signal and reduces the number of terminals of the power IC.

2 Claims, 3 Drawing Sheets

\* FOR POWER SAVING MODE OF OPERATION

\*\* FOR ORDINARY MODE OF OPERATION

* FOR POWER SAVING MODE OF OPERATION
** FOR ORDINARY MODE OF OPERATION

SWITCHING POWER SUPPLY

BACKGROUND OF THE INVENTION

1. Field of the Invention

The present invention relates generally to a switching power supply that feeds isolated DC electric power from a DC voltage source to a load via a transformer and a semiconductor switch and more particularly relates to a switching power supply that includes a changeover circuit for achieving power saving operations.

2. Description of the Prior Art

FIG. 3 is a circuit diagram of a conventional switching power supply which includes a mode changeover circuit. Referring to FIG. 3, a capacitor C0 is connected to the output of a rectifier Rect 1. A series circuit composed of a primary winding N1 of a transformer TR1 and a semiconductor switch Q1, such as a MOSFET, is connected in parallel with the capacitor C0. A capacitor C1 is connected to a first secondary winding N21 of the transformer TR1 through a series diode D1. A capacitor C2 is connected to a second secondary winding N22 of the transformer TR1 via a diode D2. A main load is connected in parallel to the capacitor C1 at terminals 300, 302. A microcomputer load is connected in parallel to the capacitor C2 at terminals 304, 302. A capacitor C3 is connected to a tertiary winding N3 of the transformer TR1 via a diode D3. The capacitor C3 is connected to a quaternary winding N4 of the transformer TR1 through a diode D4 and a transistor T4.

A voltage detector circuit is connected in parallel to the capacitor C1. The voltage detector circuit includes resistors R2 through R5, a photo-coupler PC1, a shunt regulator IC3 and a transistor T3. A switching circuit composed of transistor T1 driven by transistor T2 is connected between the diodes D1 and D2. A terminal 306 receives a power saving signal which is applied to transistors T2, T3 and a photo-coupler PC2. The switching power supply further includes a first control circuit IC1, which is operational during ordinary operation and a second control circuit IC2 which is operational during a power saving operation. The outputs of both IC1 and IC2 are connected to the gate of the switch Q1. The output of the photo-couplers PC1, PC2, are connected to the respective input terminals of the control circuits IC1 and IC2. Usually, the control circuits IC1, IC2 and the switch Q1 are integrally mounted in a single package as a power IC 308, illustratively surrounded by the broken lines in FIG. 3.

The circuit of FIG. 3 rectifies an AC voltage applied to terminals 310, 312 in the rectifier Rect 1 and applies the resulting DC voltage to the capacitor C0. As a result of the switching of the switch Q1 to an on state, the electric power stored in the capacitor C0 is transferred to the primary winding N1. By switching the switch Q1 to an off state, the energy stored in the transformer TR1 is fed to the capacitors C1, C2 via the first secondary winding N21 and the second secondary winding N22 and to the loads connected in parallel to the respective capacitors C1 and C2, thus providing an isolated DC voltage to the board. The circuit of FIG. 3 modulates the on-off ratio of the switch Q1 to regulate the output voltage, that is the voltage VC1 of the capacitor C1. The circuit, including the resistors R2 through R6, the photo-coupler PC1 and the shunt regulator IC3, detects the isolated output voltage and adjusts the on-off ratio of the switch Q1 via the control circuits IC1 and IC2 so that the detected voltage may be maintained at a certain value.

The voltage detector circuit works in the following manner. The shunt regulator IC3 feeds a current through the resistor R2 to maintain the voltage at the control terminal at a constant level. Here, the control terminal voltage is a voltage determined by the resistance values of resistors R3 through R5, as follows: $VC1 \cdot [R4 \cdot R5/(R3 \cdot R4 + R4 \cdot R5 + R5 \cdot R3)]$. As a result, a constant current flows to the input terminal of the photo-coupler PC1. In response, a proportional constant current determined by the amplification function of the photo-coupler PC1 flows from the output terminal of the photo-coupler PC1. As a result, the voltage of the resistor R6, connected in series to the output of the photo-coupler PC1, is regulated at a substantially constant value. The voltage of the resistor R6 is proportional to the output voltage VC1.

The control power supply works in the following manner. A voltage which is N3/N21 times as high as the output voltage VC1 is generated across the tertiary winding N3 of the transformer TR1, i.e., $VN3 = VC1 \cdot N_T3/N_T21$, where $N_T3$ is the number of turns of the tertiary winding N3 and $N_T21$ is the number of turns of the first secondary winding N21 of the transformer TR1. The capacitor C3 is charged via the diode D3 and provides a supply voltage for the control circuits IC1 and IC2. At the same time, DC electric power is fed from the quaternary winding N4 of the transformer TR1 to the capacitor C4 via the diode D4. By equalizing the voltage VC3 of the capacitor C3 and the voltage of the reference diode ZD1 connected to the base of the transistor T4, the electric charges discharged from the capacitor C4 flow to the reference diode ZD1. Since no current flows to the base of the transistor T4, the transistor T4 is off and no electric power is fed to the capacitor C3 through T4.

The power saving operation, which is initiated by the power saving signal applied to terminal 306, is conducted in the following manner. In response to the power saving signal, the transistor T3 turns off and electrically disconnects the resistor R5. Since the control terminal voltage of the shunt regulator IC3 is constant, removing R5 from the circuit reduces the output voltage to terminal 300. The power saving signal also turns on transistors T1 and T2 and the electric power stored in the capacitor C1 is transferred through T1 to the microcomputer power supply composed of the capacitor C2. During ordinary operation, the voltage of the microcomputer power supply is usually lower than the voltage of the main power supply. However, in the power saving mode of operation, the voltage of the main power supply is lowered to the voltage level of the microcomputer power supply.

The power saving signal is also applied to the mode changeover terminals of the control circuits IC1 and IC2 via the photo-coupler PC2. In response to the received signal, the control circuit IC2 is enabled while the control circuit IC1 is disabled, thus placing the circuit in the power saving mode of operation. The control circuit IC2 operates the switching device Q1 at a lower frequency from that in the ordinary operation so that the losses caused in the transformer TR1 and the switch Q1 are reduced.

Finally, the control power supply of the IC's will be explained. The voltage of the tertiary winding N3 also lowers in response to the lowering of the main power supply voltage. The capacitor C4 is fed by the voltage of the quaternary winding N4 through diode D4. When the voltage on the capacitor C3 is less than that of the reference diode ZD1, a current flows from capacitor C4 through the resistor R8 to the base of the transistor T4, thereby turning on transistor T4. As a result, the capacitor C3 receives the electric power for the control circuits IC1, IC2 from the quaternary winding N4 via the diode D4. When the voltage of the capacitor C3 becomes higher than that of the reference diode ZD1, the base current of the transistor T4 no longer flows and the transistor T4 is turned off. As a result, the voltage of the capacitor C3 is equalized to that of the reference diode ZD1. By equalizing the voltage of the tertiary winding N3 to that of the reference diode ZD1, the control voltage, i.e., the voltage of the capacitor C3, is the same in both the ordinary and power saving modes of operations.

In other words, the circuit of FIG. 3 operates to feed the ordinary electric power to the main load at a high frequency that facilitates reducing the dimensions of the transformer and such component parts while, operating at a low frequency to feed the electric power only to the microcomputer during a power saving mode of operation.

However, it is necessary for the circuit of FIG. 3 to use the photo-coupler PC2 for transmitting the changeover signal from the secondary side of the power supply (from the microcomputer) to the control circuits IC1 and IC2 to switch from the ordinary mode of operation to the power saving mode of operation. To provide adequate isolation, it is necessary for the photo-coupler to maintain a certain insulation distance, specified by insulation standards. Therefore, the printed circuit board and such structural parts must have large dimensions, resulting in a large and expensive switching power supply. The use of photo-coupler PC2 for transmitting the changeover signal also increases the number of terminals of the power IC that incorporates the control circuits IC1 and IC2 and the switch Q1, resulting in a large and expensive power IC.

OBJECTS AND SUMMARY OF THE INVENTION

In view of the foregoing, it is an object of the invention to reduce the dimensions and costs of the power IC. It is another object of the invention to reduce the dimensions and costs of the switching power supply having a changeover feature.

According to a first embodiment of the invention, a switching power supply receiving a voltage from DC power supply and generating an isolated DC voltage for a load includes a transformer having a primary winding, a secondary winding and a tertiary winding and a semiconductor switch connected to the DC power supply through the primary winding. A control circuit is provided for controlling said semiconductor switch. A rectifier is operatively coupled to the secondary winding, whereby the isolated DC voltage is generated. A regular circuit is coupled to the rectifier and reduces the isolated DC voltage in response to a received power saving mode signal. A power supply circuit is included which is responsive to a voltage output of said tertiary winding and generates a voltage output to power the control circuit. A voltage detector circuit is responsive to the power supply circuit and provides an output signal when the voltage output is less than a predetermined value. The control circuit receives the voltage detector circuit output signal and reduces the operating frequency of the semiconductor switch in response thereto, thereby providing a power saving mode of operation.

According to the first aspect of the invention, the voltage of the tertiary winding lowers in response to a lowering of the main power supply voltage in the power saving mode of operation. By monitoring the voltage of the control power supply, operation is shifted to the power saving mode when lowering of the control voltage below a predetermined value is detected. Since this circuit configuration transmits the power saving signal via the tertiary winding of the transformer, the prior art photo-coupler for signal transmission becomes unnecessary. Moreover, since the terminal for inputting the power saving signal is unnecessary, the number of terminals of the power IC is reduced.

According to a second embodiment of the invention, a switching power supply receiving a voltage from DC power supply and generating an insulated DC voltage for a load, includes a transformer having a primary winding, a secondary winding, a tertiary winding and a quaternary winding and a semiconductor switch connected to the DC power supply through the primary winding. A rectifier circuit is operatively coupled to the secondary winding, whereby the isolated DC voltage is generated. A regulator circuit is connected to the rectifier circuit and reduces the DC isolated voltage in response to a received power saving mode signal. A control circuit is provided for controlling the semiconductor switch. A first power supply circuit rectifies the output of the tertiary winding and provides power to the control circuit in an ordinary mode of operation. A second power supply circuit rectifies the output of the quaternary winding and provides power to the control circuit in a power saving mode of operation. A voltage detector circuit monitors the power fed to the control circuit from the first and second power supply circuits and provides an output signal when the voltage is detected at a value below a predetermined value. The control circuit reduces the operating frequency of the semiconductor switch in response to the output signal from the voltage detector circuit, thereby providing a power saving mode of operation.

BRIEF DESCRIPTION OF THE DRAWINGS

Preferred embodiments of the present invention will be described in connection with the accompanying drawings, wherein.

DETAILED DESCRIPTION OF PREFERRED EMBODIMENTS

Figure 1:
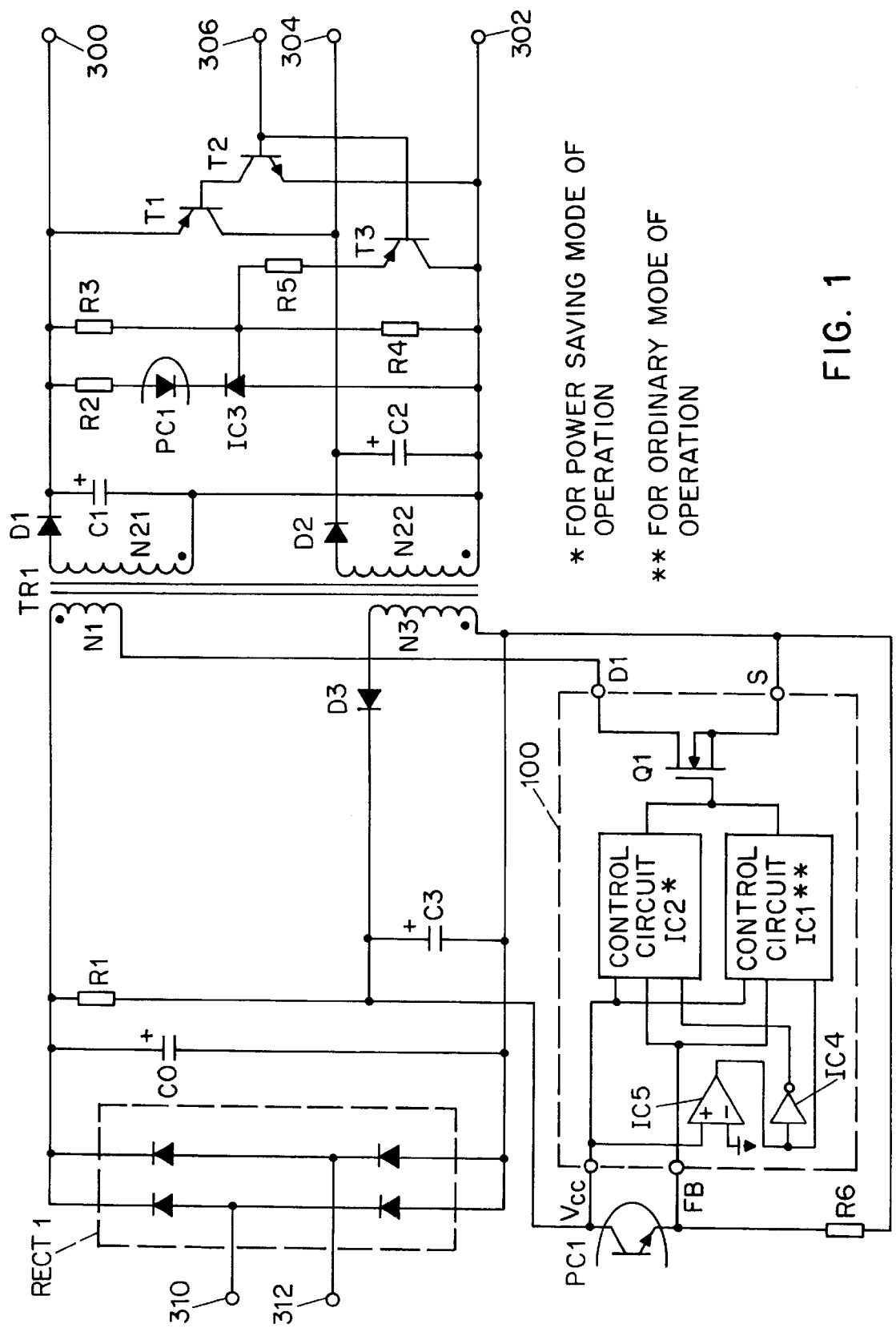
FIG. 1 is a circuit diagram of a switching power supply including a changeover circuit according to a first embodiment of the invention.

The present invention will be explained hereinafter with reference to the accompanying drawings which illustrate preferred embodiments of the invention. Throughout these figures, like parts are designated by the same reference numerals and their duplicated explanations are omitted for the sake of clarity.

Figure 3:
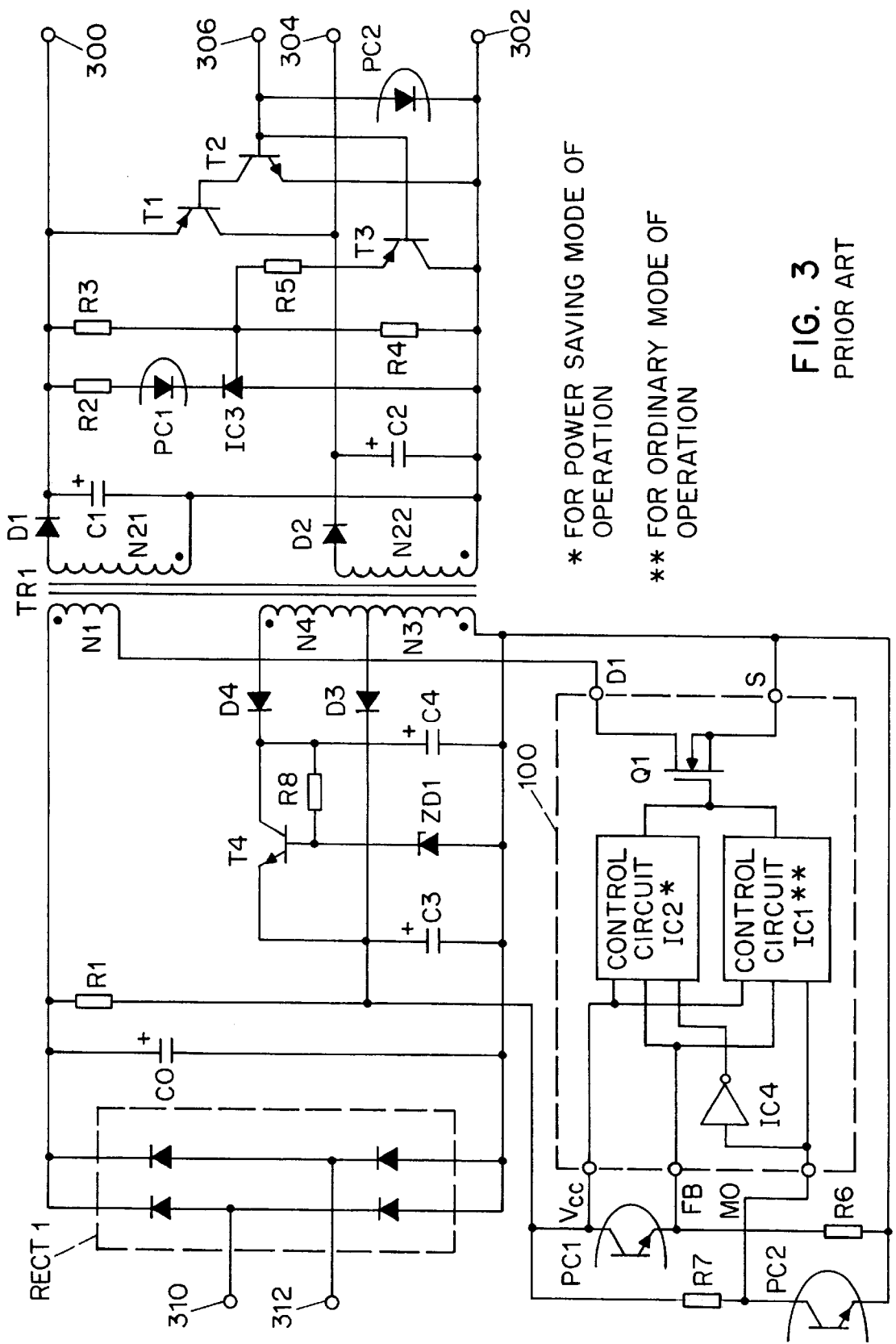
FIG. 3 is a circuit diagram of a switching power supply including a changeover circuit, known in the prior art.

FIG. 1 is a circuit diagram of a switching power supply including a changeover circuit according to a first embodiment of the invention. The switching power supply of FIG. 1 does not include the quaternary winding N4, diode D4, resistors R7 and R8, transistor T4, reference diode ZD1, capacitor C4, and photo-coupler PC2 used in the prior art design depicted in FIG. 3. Instead, a comparator IC5 is disposed in the improved power IC 100. Since the switching power supply of FIG. 1 works in the same manner as in FIG. 3 in the ordinary mode of operation, only the power saving mode of operation will be described.

Referring to FIG. 1, when the power saving signal is applied to terminal 306, the transistor T3 is turned off, resulting in a lowered output voltage on terminal 300. In association with the lowering of the main power supply voltage VC1, the voltage of the tertiary winding N3 also lowers, resulting in a reduction of the control voltage VC3. The comparator IC5 is responsive to the voltage VC3 and changes states when this control voltage is reduced below a predetermined threshold value. When the comparator IC5 changes states in response to detection of a reduced control voltage VC3, the control circuit IC1 is disabled (i.e., the ordinary mode of operation is terminated) and the control circuit IC2 is enabled, thus initiating the power saving mode of operation. As with the prior art design, the control circuit IC2 operates at a frequency lower than the operating frequency of the control circuit IC1. Therefore, power losses from the transistors and the switch Q1 are reduced. As a result of this circuit configuration, the circuit of FIG. 1 does not require the photo-coupler PC2 for transmitting the power saving signal from terminal 306 to the power IC. An isolated signal is provided through the transformer TR1 by way of the reduced voltage presented at the tertiary winding N3.

Figure 2:
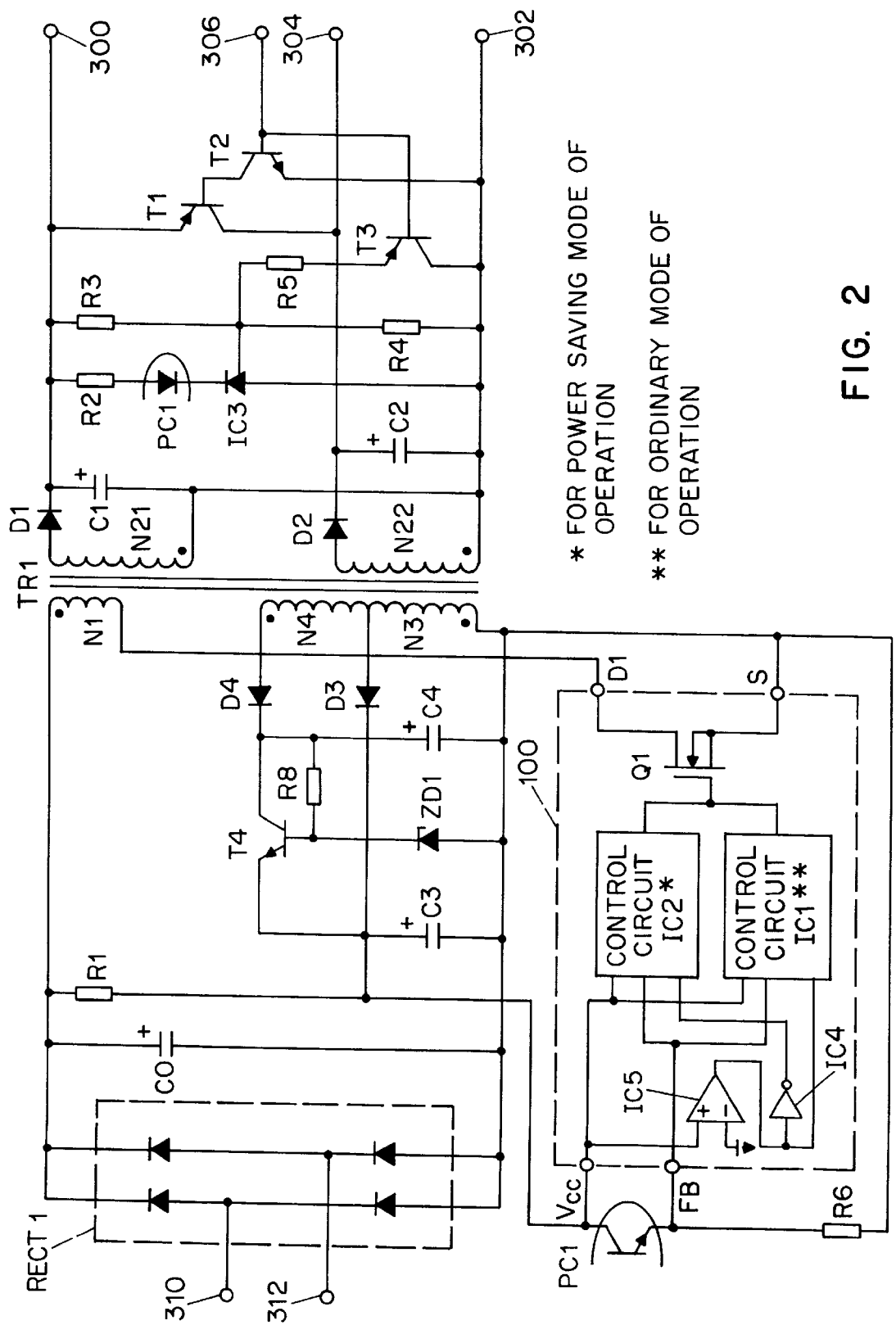
FIG. 2 is a circuit diagram of a switching power supply including a changeover circuit according to a second embodiment of the invention.

FIG. 2 is a circuit diagram of a switching power supply including a changeover circuit according to a second embodiment of the invention. The switching power supply of FIG. 2 does not include the resistor R7 and photo-coupler PC2 used in the circuit of FIG. 3 to transfer the changeover signal. Instead, a comparator IC5 is disposed in the power IC and a reference diode ZD2, the reference voltage of which is lower than the voltage VN3 of the tertiary winding N3 during normal operation, is used in place of the reference diode ZD1. Since the switching power supply of FIG. 2 works in the same manner as in FIG. 3 in the ordinary mode of operation, only the power saving mode of operation will be described.

Referring to FIG. 2, as before, the transistor T3 is turned off in response to an applied power saving signal to terminal 306, resulting in a lowered output voltage at terminal 300. In association with the lowering of the main power supply voltage VC1, the voltage of the tertiary winding N3 lowers, resulting in a lowering of the control voltage VC3. Then, the electric charge stored in the capacitor C4 results in a voltage which is applied to the resistor R8 and the base of the transistor T4, thereby turning transistor T4 on. As a result, electric power is fed to the capacitor C3 from the quaternary winding via the diode D4 and the transistor T4. At this instance, the voltage VC3 of the capacitor C3 is equal to the voltage of the reference diode ZD2 plus the voltage $V_{BE}$ dropped across transistor T4. By setting the reference voltage of the reference diode ZD2 to a value lower than the voltage ordinary operating of the tertiary winding N3, the voltage VC3 to the control integrated circuit 100 in the power saving mode of operation is lower than in the ordinary mode of operation. By detecting the lowering of the control voltage VC3 with the comparator IC5, the operation of the control circuit IC1 is disabled and the control circuit IC2 is enabled to provide the power saving mode of operation, as described previously in connection with FIG. 1.

In the circuit of FIG. 1, there may cases where the control voltage is too low to drive the MOSFET Q1 due to too high of a difference between the voltages of the main power supply and the microcomputer power supply. However, the circuit of FIG. 2 avoids such an unwanted condition.

In a switching power supply formed in accordance with the present invention, the changeover signal for changing over between the ordinary and power saving modes is fed from the secondary side of the power supply (microcomputer side) to the control circuits IC1 and IC2 without using the photo-coupler PC2. Therefore, the dimensions of the structural parts such as the printed circuit board for mounting the photo-coupler and such devices are reduced, resulting in a small and low-cost switching power supply. Moreover, the number of terminals of the power IC that incorporates the control circuits IC1, IC2 and the MOSFET Q1 in the switching power supply is reduced, resulting in a smaller and lower cost power IC.

While the present invention has been described in connection with preferred embodiments thereof, it will be appreciated that these embodiments are illustrative and are not intended to limit the scope of the invention. Various modifications and equivalents of the described embodiments are also within the scope of the invention, which is defined by the appended claims.

What is claimed is:

1. A switching power supply receiving a voltage from a DC power supply and generating an isolated DC voltage for a load, the switching power supply having a power saving mode initiated by a received power saving signal, the switching power supply comprising:

a transformer including a primary winding, a secondary winding and a tertiary winding;

a semiconductor switch connected to the DC power supply through said primary winding;

a control circuit for controlling said semiconductor switch;

a rectifier circuit, said rectifier circuit being operatively coupled to said secondary winding, whereby the isolated DC voltage is generated;

a voltage regulator circuit, said voltage regulator circuit being operatively coupled to said rectifier circuit and selectively reducing the isolated DC voltage in response to a received power saving signal;

a power supply circuit, said power supply circuit being responsive to a voltage output of said tertiary winding and providing a voltage output to said control circuit; and a voltage detector circuit, said voltage detector circuit being responsive to said power supply circuit and providing an output signal when the voltage output is less than a predetermined value, said control circuit receiving said voltage detector circuit output signal and reducing the operating frequency of said semiconductor switch in response thereto, whereby a power saving mode of operation is provided in response to the received power saving signal.

2. A switching power supply receiving a voltage from a DC power supply and generating an isolated DC voltage for a load, the switching power supply having a power saving mode initiated by a received power saving signal, the switching power supply comprising:

a transformer including a primary winding, a secondary winding, a tertiary winding and a quaternary winding;

a semiconductor switch connected to said DC power supply through said primary winding;

a rectifier circuit, said rectifier circuit being operatively coupled to said secondary winding, whereby the isolated DC voltage is generated;

a voltage regulator circuit, said voltage regulator circuit being operatively coupled to said rectifier circuit and selectively reducing the isolated DC voltage in response to a received power saving signal;

a control circuit for controlling said semiconductor switch;

a first power supply circuit for rectifying the output of said tertiary winding and providing power to said control circuit in an ordinary mode of operation;

a second power supply circuit for rectifying the output of said quaternary winding and providing power to said control circuit in a power saving mode of operation; and a voltage detector circuit for monitoring the power fed to said control circuit from said first and second power supply circuits and providing an output signal when voltage is detected at a value lower than a predetermined value, for said control circuit to reduce the operating frequency of said semiconductor switch in response to the output signal from said voltage detector circuit, thereby providing a power saving mode of operation.

* * * * *